United States Patent [19]

Fasciati

[11] Patent Number: 4,612,369
[45] Date of Patent: Sep. 16, 1986

[54] DISAZO 4,4′-DIAMINOSTILBENE-2,2′-DISULFONIC ACIDS DYE

[75] Inventor: Alfred Fasciati, Bottmingen, Switzerland

[73] Assignee: Ciba-Geigy Corporation, Ardsley, N.Y.

[21] Appl. No.: 462,505

[22] Filed: Jan. 31, 1983

Related U.S. Application Data

[63] Continuation of Ser. No. 228,657, Jan. 26, 1981, abandoned, which is a continuation of Ser. No. 49,815, Jun. 18, 1979, abandoned.

[30] Foreign Application Priority Data

Jun. 30, 1978 [CH] Switzerland ............... 7164/78

[51] Int. Cl.$^4$ ............... C09B 32/215; C09B 56/04; D06P 1/06; D06P 3/24
[52] U.S. Cl. ............... 534/689; 534/596
[58] Field of Search ............... 260/174, 176, 178, 184, 260/186; 534/689

[56] References Cited

U.S. PATENT DOCUMENTS

| | | | |
|---|---|---|---|
| 2,286,838 | 6/1942 | Seymour et al. ............... | 260/178 X |
| 2,863,875 | 12/1958 | Bienert et al. ............... | 260/178 X |
| 4,008,216 | 2/1977 | Sommer et al. ............... | 260/186 |
| 4,055,560 | 10/1977 | Dombchik ............... | 260/186 |

FOREIGN PATENT DOCUMENTS

| | | | |
|---|---|---|---|
| 673070 | 3/1966 | Belgium ............... | 260/186 |
| 42466 | 11/1886 | Fed. Rep. of Germany ...... | 260/186 |
| 51-151724 | 12/1976 | Japan ............... | 260/186 |

Primary Examiner—Floyd D. Higel
Attorney, Agent, or Firm—Edward McC. Roberts; Meredith C. Findlay

[57] ABSTRACT

Disazo dyes of the formula

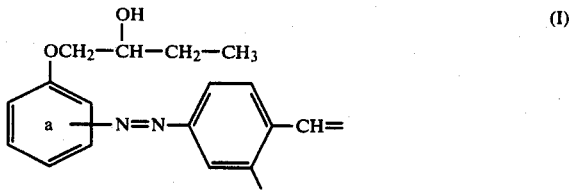

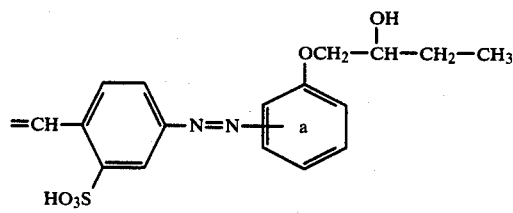

wherein the rings "a" either contain no further substituents and carry the azo group in the para-position to the β-hydroxybutoxy group, or contain a $C_1$–$C_4$alkyl of $C_1$–$C_2$ alkoxy radical in the para-position, and carry the azo group in the ortho-position, to the β-hydroxybutoxy group. The dyes are specially suitable for dying and printing polyamide carpets. The dyes are distinguished by good solubility, good exhaustion and good fastness properties, including fastness to perspiration.

1 Claim, No Drawings

DISAZO 4,4'-DIAMINOSTILBENE-2,2'-DISULFONIC ACIDS DYE

This is a continuation of application Ser. No. 228,657 filed Jan. 26, 1981, now abandoned, which is a continuation of Ser. No. 049,815 filed June 18, 1979, now abandoned.

The present invention provides novel disazo dyes of the probable formula

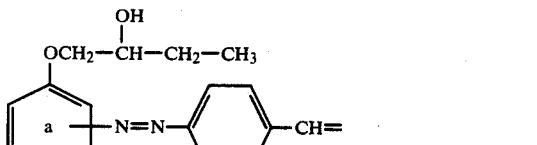

(I)

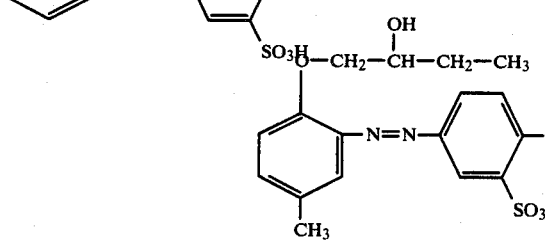

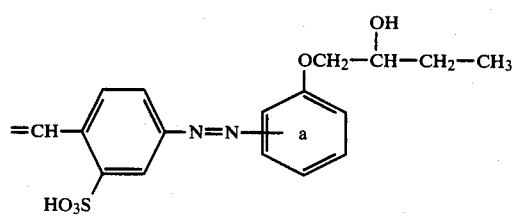

wherein the rings "a" either contain no further substituents and carry the azo group in the para-position to the β-hydroxybutoxy group, or contain a $C_1$-$C_4$alkyl or $C_1$-$C_2$-alkoxy radical in the para-position, and carry the azo group in the ortho-position, to the β-hydroxybutoxy group.

The dyes of this invention are obtained by methods which are known per se, by reacting a compound of the formula

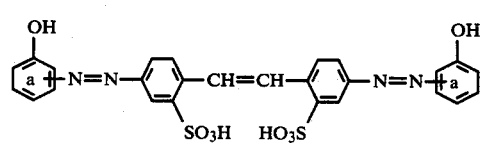

(II)

with butylene oxide. It is possible that in this reaction the product of the formula (I) is not obtained alone, but also a certain amount of the isomeric compound that contains α-hydroxyisobutoxy groups instead of β-hydroxybutoxy groups. Throughout this specification, however, the formula (I) is always used to denote the reaction product.

The dye of the formula

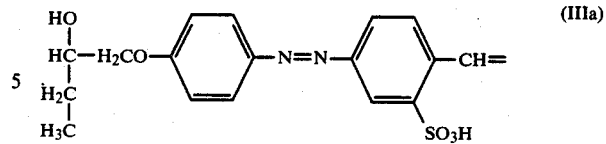

(IIIa)

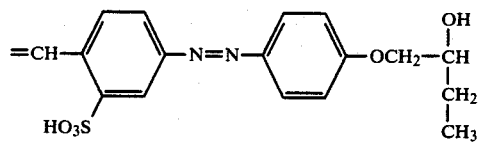

is particularly preferred, as is also the dye of the formula

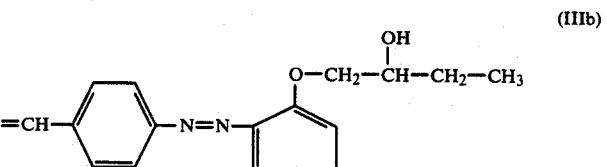

(IIIb)

The dye corresponding to the dye of the formula (IIIa), and which carries an ethoxy group instead of the β-hydroxybutoxy group, is known from German patent specification No. 42 466. The drawback of this dye is, however, that it is not suitable for use in printing pastes. Usually precipitations of the dye are formed in the printing pastes obtained therewith. The corresponding methoxy compound also does not result in the stable printing pastes desired in practice.

Surprisingly, the introduction of a β-hydroxybutoxy group results in dyes which are distinguished by good solubility, excellent stability in printing pastes, rapid fixation of the dye in prints, good exhaustion and at the same time good fastness properties, such as fastness to light, rubbing, washing, perspiration, water, alkali and acid.

The novel dyes are suitable for dyeing and, in particular, for printing materials derived from natural or synthetic polyamide. They can be used both in the exhaust method and especially in continuous dyeing processes or in printing processes. They are especially suitable for dyeing and printing polyamide carpets.

The printing paste or dyebath also constitutes an object of the invention and contains water, a dye of the formula (I) and optionally further ingredients, for example assistants, i.e. organic compounds which act as solvent for the dye, are liquid under dyeing conditions, are insoluble or poorly soluble in water, and in which the dye is more readily soluble than in water. Examples of such assistants are benzyl alcohol and compounds of the general formula (IV)

wherein R represents a phenyl group which is unsubstituted or substituted by chlorine, and n is 1 to 3.

Particularly suitable compounds of the formula (IV) which can be used according to the invention are phenoxyethanol or compounds which consist on average of 1 mole of ethylene oxide per mole of dichlorophenol or, preferably, monochlorophenol. Examples of these compounds which afford particularly good results are those obtained from 1 mole of ethylene oxide and o-, m- or p-chlorophenol and also mixtures of these compounds.

These assistants are employed in amounts of 1 to 5, preferably 2 to 4, percent by volume, based on the total volume of the aqueous printing paste or dyebath.

If desired, the dyebath or printing paste can additionally contain inorganic or organic acids and their acid addition salts which are normally used in dyeing processes for adjusting a pH value between 5 and 7, for example phosphoric acid, sodium phosphate, ammonium acetate or ammonium sulfate, alkylsulfonic or arylsulfonic acid, formic acid, lactic acid, chloroacetic acid and, in particular, acetic acid for wool and polyamides and sodium chloride for cotton. These additives are preferably employed in amounts of 1 to 5 percent by weight, based on the total weight of the dyebath or printing paste.

Preferably, the dyebath or printing paste contains a thickener customarily employed in textile printing and which is compatible with the dye, for example one based on guar gum or locust bean gum ether. The dyebath or printing paste can also contain other conventional additives, for example a solvent for the dye, such as urea, and an oxidant, such as sodium chlorate.

In addition, the dyebath or printing paste can optionally contain anionic or non-ionic surfactants or other assistants, such as moth proofers, antifoams or chelating agents.

The amount of dye employed depends on the circumstances, for example the desired depth of shade, and can be in the range from 0.1 to 1% by weight, preferably, however, at least 0.2% by weight, based on the total weight of the dyebath or printing paste. The liquor ratio is ordinarily 5:1 to 40:1.

If a printing or continuous dyeing method is carried out, the impregnation with the dye is advantageously effected at a temperature below the fixation temperature of the dye. The impregnation temperature can be for example up to 60° C.; preferably, however, it is in the region of room temperature.

In a continuous dyeing process, the material is first impregnated with the dyebath and then excess liquor is squeezed out, for example by rolling. The printing paste is applied by conventional methods, for example with a film printing machine, Vigoureux machine or another printing machine.

After it has been impregnated, the material is optionally dried, then steamed, washed and dried. Steaming can be carried out at a temperature of up to 150° C., preferably between 100° C. and 110° C., for example with saturated or superheated steam of atmospheric pressure. If desired, the pressure can also be up to 0.5 atmospheres higher.

If dyeing is carried out by the exhaust method, the material can be immersed in the aqueous dyebath, which contains the dye and optionally further ingredients, at a temperature from about 40° to 60° C. The temperature is then raised and dyeing is continued, for example in the range between 80° C. and the boiling point. The dyeing time can vary depending on the requirements and is for example between 15 minutes and 2 hours. The material is subsequently washed and dried in the conventional manner.

The invention is illustrated by the following Examples, in which parts and percentages are by weight.

EXAMPLE 1

37 parts of 4,4'-diaminostilbene-2,2'-disulfonic acid are dissolved in 200 parts of water with 11.5 parts of calcined sodium carbonate and to this solution are then added 50 parts of 30% hydrochloric acid. The mixture is cooled to 5° C. and diazotised by the addition of 50 parts of 4N sodium nitrite.

A solution of 20 parts of phenol in 50 parts of water is then added to the diazo solution. After cooling to 0° C., a solution of 50 parts of sodium carbonate in 200 parts of water is added all at once to the resulting suspension. When the coupling is complete, the dye is precipitated completely by addition of 150 parts of sodium chloride.

Yield: about 68 parts of dry dye.

70 parts of the above dye are stirred in 500 parts of water at 50° C. Then 5 parts of triethylamine are added and the pH is adjusted to 9 with sodium hydroxide. Then 57.8 parts of butylene oxide are added and the batch is stirred until the etherification of both hydroxyl groups is complete. If necessary, further butylene oxide can be added. The dyestuff suspension is adjusted to pH 7 and the dye is precipitated with sodium chloride.

The resulting dye dissolves in water to produce a yellow solution and in concentrated sulfuric acid to produce a violet solution. It dyes polyamide material from a weakly acid bath in pure golden yellow shades of excellent fastness properties.

A yellow dye having similar properties is obtained by substituting an equivalent amount of p-cresol for the 20 parts of phenol and repeating the above procedure.

EXAMPLE 2

A printing paste is prepared from the following ingredients:
- 4 g of the dye of Example 1,
- 2 g of an assistant containing alkylphenolethoxylate, coconut fatty acid amide and solvent,
- 550 g of a 4% thickener solution based on guar gum,
- 10 g of 80% acetic acid, and
- 434 g of water.

A nylon carpet is printed with this paste at 15° C. by film printing, dried, and steamed for 10 minutes in saturated steam of atmospheric pressure. The carpet is then washed carefully with cold water and dried. A yellow print with sharp contours is obtained on the carpet.

EXAMPLE 3

100 g of nylon 66 fabric is immersed in an aqueous dyebath which contains 4 g of the dye of Example 1,
- 20 g of benzyl alcohol,
- 10 g of glacial acetic acid and
- 1000 g of water.

The fabric is put into the bath at 40° C. The bath is then heated to boiling temperature and dyeing is continued for 1 hour at this temperature. The fabric is then washed with water and dried. A level yellow dyeing is obtained.

EXAMPLE 4

100 g of nylon 66 carpet yarn is immersed in an aqueous dyebath which contains, per liter,
- 1 g of the dye of Example 1,
- 2 g of sodium dihydrogen phosphate,
- 0.5 g of disodium hydrogen phosphate and 1 g of an assistant consisting of an aqueous solution of alkyoaminopolyglycol ether and an aldehyde.

The yarn is put into the dyebath at 40° C. The bath is then heated to 100° C. and dyeing is continued for 1 hour. The yarn is subsequently washed and dried. A level yellow dyeing is obtained.

EXAMPLE 5

100 g of nylon needle-felt carpet are put into an aqueous dyebath which contains, per liter, 2 g of the dye of Example 1,
2 g of thickener based on locust bean gum ether,
2 g of sodium dihydrogen phosphate and
2 g of the assistant of Example 2.

After immersion, the carpet material is removed from the bath and held vertically, so that excess dye liquor can drip off. The pick-up is 450%. The impregnated piece of carpet is then steamed in a loop steamer for 8 minutes at 101° C. in saturated steam. A level golden yellow dyeing is obtained.

What is claimed is:

1. A disazo dye of the formula

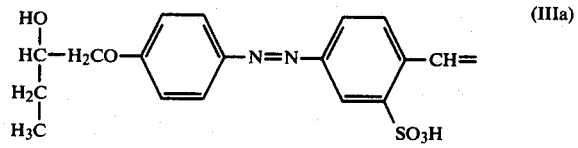

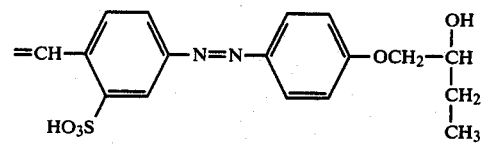

(IIIa)

* * * * *